US007369866B2

(12) United States Patent
Choi

(10) Patent No.: US 7,369,866 B2
(45) Date of Patent: May 6, 2008

(54) MESSAGE PROCESSING FOR COMMUNICATION TERMINAL

(75) Inventor: Bo-Hui Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 11/106,742

(22) Filed: Apr. 15, 2005

(65) Prior Publication Data

US 2005/0233757 A1 Oct. 20, 2005

(30) Foreign Application Priority Data

Apr. 19, 2004 (KR) ...................... 10-2004-0026853

(51) Int. Cl.
*H04Q 7/20* (2006.01)
*H04M 1/00* (2006.01)

(52) U.S. Cl. ........................................ 455/466; 379/354

(58) Field of Classification Search ................ 455/466, 455/414.1, 550.1, 11.1, 566, 412.1, 556; 379/354, 142, 88.19, 88.21, 93.23, 120, 127, 379/352, 356.01, 355.02, 355.08
See application file for complete search history.

(56) References Cited

U.S. PATENT DOCUMENTS 5,299,261 A * 3/1994 Bogart et al. ............... 379/354
5,991,383 A * 11/1999 Kucmerowski et al. ..................... 379/142.04
6,094,587 A * 7/2000 Armanto et al. ............ 455/567
7,062,034 B2 * 6/2006 Gibbs et al. ................ 379/354
2004/0038705 A1 * 2/2004 Katayama ................ 455/550.1

FOREIGN PATENT DOCUMENTS

KR 10 2000-0077128 12/2000

OTHER PUBLICATIONS

Seung-Shik Kang, Chong-Woo Woo: "Automatic Segmentation of Words Using Syllable Bigram Statistics" Proceedings of the 6th Natural Language Processing Pacific Rim Symposium, Nov. 27, 2001, XP002374478.

* cited by examiner

*Primary Examiner*—Naghmeh Mehrpour
(74) *Attorney, Agent, or Firm*—Lee, Hong, Degerman, Kang & Schmadeka

(57) ABSTRACT

Message processing for a communication terminal is disclosed. In one embodiment, a method for preparing an outgoing message includes composing the message, programming control information for performing a word spacing function, and associating the outgoing message with the control information. The control information may preferably assert whether to insert spaces between words of the outgoing message. In another embodiment, a method for processing a message includes receiving an incoming message and incoming control information for performing the word spacing function, and arranging the incoming message based on the incoming control information. An unspaced message may be sent, allowing the sending to include more letters, numbers, symbols, or other 'non-space characters' in the message. Furthermore, because the message is sent with the control information, the message may be arranged and displayed in spaced-wording format, allowing for easier reading by the message recipient.

22 Claims, 6 Drawing Sheets

Start
S10 Select message writing menu
S20 Set word spacing function
S30 Compose message
S40 Send message
End

MESSAGE PROCESSING FOR COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 10-2004-0026853, filed on Apr. 19, 2004, the contents of which is hereby incorporated by reference herein in its entirety.

BACKGROUND OF THE INVENTION

1. Field of the Invention

The present invention relates generally to a communication terminal, and more particularly to message processing for a communication terminal.

2. Discussion of the Related Art

Radio communications technologies have become more useful and convenient to users as more services are provided. One such service is known as Short Message Service (SMS), a multimedia service that may be provided through a communication terminal such as a mobile terminal.

SMS is a point-to-point (PTP) service used to send a relatively short message from a single sender to a single recipient. The message is composed using an application program of the communication terminal, such as an SMS editor.

In preparing an SMS message, the user typically selects from a message menu provided in the communication terminal. The SMS editor then displays a main window for composing the SMS message on a liquid crystal display (LCD) screen. Next, the user selects an option from a "language" menu displayed in the main window. Then, the SMS editor displays submenus to enable the user to select from various options such as "language", "numbers", "upper case characters", "lower case characters" and "special characters".

The user then selects from the submenus and composes the SMS message. When composing the SMS message, the user may write the message with spaces between words so that the message recipient may more easily understand the message. Once the SMS message is composed, the user presses a "send" key to send the message to the recipient. However, if the message is composed with spaces between the words, the spaces are counted as part of the number of transmittable characters. Because there is a limit on the maximum number of characters that may be sent in each message, the number of "non-space" transmittable characters is reduced by the number of "space" characters. In other words, the maximum character capacity is reduced by an amount equal to the number of spaces included in the message.

Conversely, when the user composes the message without spaces between words, the number of "non-space" transmittable characters is not reduced because there are no "space" characters. However, without spaces between the words it is difficult for the recipient to read the message.

SUMMARY OF THE INVENTION

The present invention is directed to preparing and processing messages in communication terminals such that the messages may be composed and sent without spaces between words. A word spacing function is used so that the message may be arranged and displayed with spaces between the words upon receipt of the sent message.

An object of the present invention is to provide a message display method for wired and mobile communication terminals that enables transmission of textual messages containing as many characters as possible and also enables easier reading of the messages by recipients.

Another object of the present invention is to provide a message display method for a communications terminal such that the message is written without spaces but displayed in a spaced-wording format.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a message display method for a communications terminal, the method including the steps of sending a text message without spaces between words and for which a function of displaying text with word spacing is set from a transmitting end, and arranging and displaying the received text message in a spaced-wording format according to the setting condition of the function of displaying text with word spacing at a receiving end.

Preferably, the function of displaying text with word spacing is set by being selected from a message menu at a terminal at the transmitting end.

Preferably, the text message is composed without any spaces, and as transmitted includes setting information (control information) of the function of displaying text with word spacing (word spacing function).

Preferably, the text message includes a SMS (Short Message Service), a LMS (Long Message Service), a MMS (Multimedia Messaging System), or an E-mail type text message.

Preferably, the message display method further includes a step for checking whether the transmitted text message includes the setting information of the function of displaying text with word spacing.

Preferably, a structure of the received message is analyzed on the basis of a word dictionary database (DB) at the receiving end, and the received message is arranged and displayed in spaced-wording format according to the word dictionary database.

In one embodiment, a method for preparing a message includes composing the message, programming control information for performing a word spacing function, and associating the message with the control information. The control information may preferably assert whether to insert spaces between words of the message. That is, the control information may preferably dictate whether or not spaces are to be inserted between words in an unspaced text message. The determination of whether or not to insert spaces is made by the user in programming the control information by, for example, making an appropriate menu selection. The message may preferably be a text message and may preferably be composed without word spacing. The step of programming the control information may preferably include setting one data bit (check bit). The method may preferably also include sending the message and the control information (corresponding control information).

In another embodiment, a method for processing a message includes receiving the message and control information for performing a word spacing function, and arranging the message based on the control information. The step of arranging the message based on the control information may preferably include steps of arranging the message in spaced-wording format if the control information is programmed (set) to arrange the message with word spacing, and arranging the message without word spacing if the control information is programmed to arrange the message without word spacing. The step of arranging the message based on the control information may also preferably include a step of analyzing the message using a word dictionary database to recognize words in the message.

The method for processing a message at a communication terminal may also preferably include a step of checking whether the word spacing function is set to display the message with word spacing. The method for processing a message at a communication terminal may also preferably include steps of displaying the message in spaced-wording format if the control information is programmed to display the message with word spacing and displaying the message without word spacing if the control information is programmed to display the message without word spacing.

The message may preferably be a short message service (SMS) message, a long message service (LMS) message, a multimedia messaging system (MMS) message, or an electronic mail (E-mail) message. The communication terminals may be either wired, mobile, or some combination of wired and mobile terminals. The step of setting the word spacing function may preferably include selecting an appropriate option from a message menu displayed in the communication terminal.

In yet another embodiment, a communication apparatus includes a message composer used to compose a message and a programmer used to program control information for performing a word spacing function. The communication apparatus also includes a transmitter configured to transmit the message and the control information to another communication apparatus. The communication apparatus also includes a receiver, configured to receive a message and control information sent from the another communication apparatus. The communication apparatus also includes an arranger, configured to arrange the message sent from the another communication apparatus based on the control information sent from the another communication apparatus.

By sending the message without spacing between words (unspaced message), the user of the communication terminal that sends the message (sending terminal) may include more letters, numbers, symbols, or other 'non-space characters' in the message being sent because 'space characters' are not using available message character capacity. Furthermore, because the message is sent with the word spacing function, when the message is received at the receiving communication terminal (receiving terminal), the message may be arranged and displayed with spaces between the words (spaced-wording format). By displaying the message in spaced-wording format, the message may be more easily read by the user of the receiving terminal.

Although the present invention may preferably be applied to text messages, the present invention may also be applied to other types of messages, including non-text messages.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Figure 1:
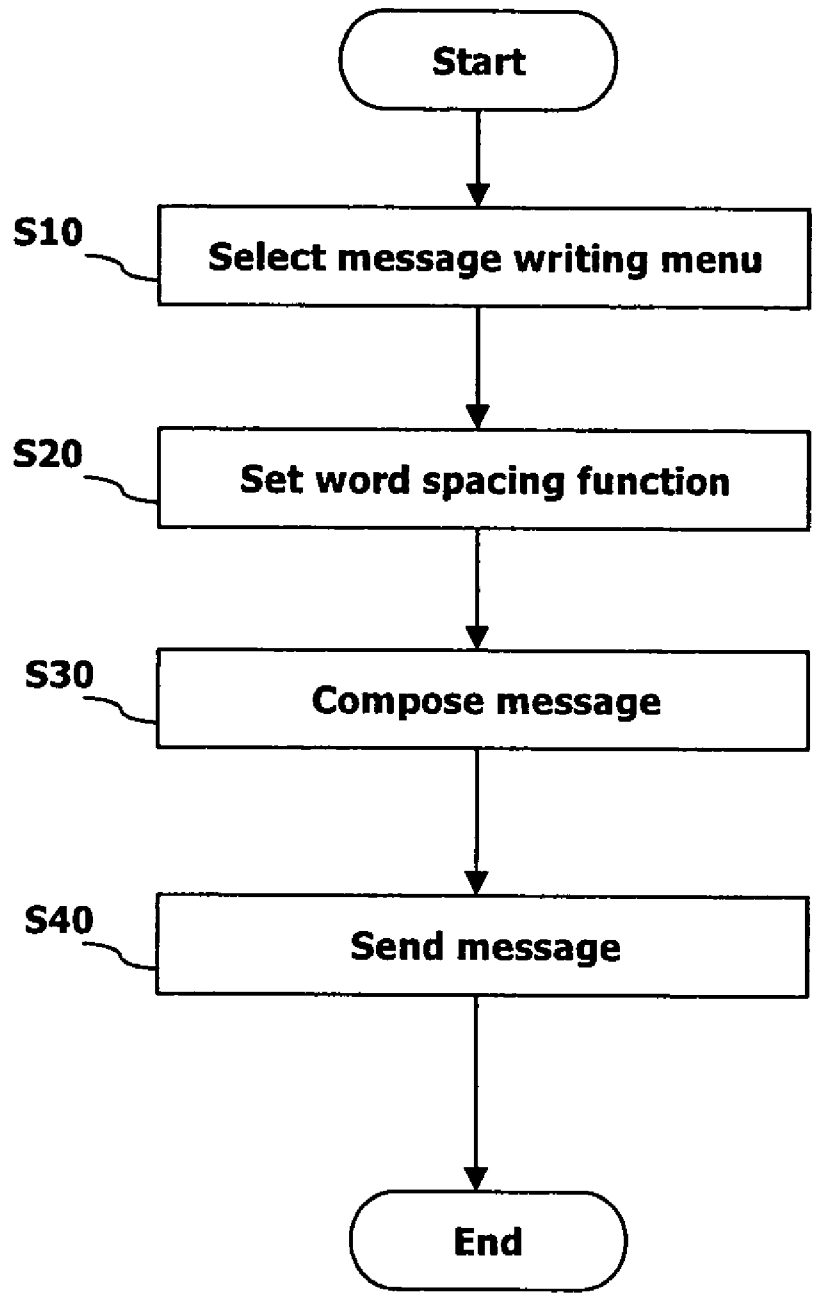
FIG. 1 is a flow diagram illustrating a method for preparing and sending a message, according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The present invention is directed to preparing and processing messages in communication terminals such that the messages may be composed and sent without spaces between words. A word spacing function is used so that the message may be arranged and displayed with spaces between the words upon receipt of the sent message.

The techniques for preparing and processing messages in communication terminals may be applied to any type of message, preferably a text message, including, for example, a short message service (SMS) message, a long message service (LMS) message, a multimedia messaging system (MMS) message, or an electronic mail (E-mail) text message. The communication terminals may be either wired terminals or mobile terminals, or a combination of wired and mobile terminals. Control information for performing the word spacing function may preferably be programmed by selecting an appropriate option from a message menu displayed in a message sending communication terminal.

By sending the message without spacing between words (unspaced message), the user of the communication terminal that sends the message (sending terminal) may include more letters, numbers, symbols, or other 'non-space characters' in the message being sent because 'space characters' are not using available message character capacity. Furthermore, because the message is sent with the word spacing function, when the message is received at the receiving communication terminal (receiving terminal), the message may be arranged and displayed with spaces between the words (spaced-wording format). By displaying the message in spaced-wording format, the message may be more easily read by the user of the receiving terminal. It shall be understood that the sending terminal and the receiving terminal may be transceivers, capable of sending and receiving messages. The terms 'sending terminal' and 'receiving terminal' are used to simplify related explanations.

The communication terminal may preferably include a word dictionary database (DB) having words, a spelling system, a loanword notation, word spacing and other features. The communication terminal may also preferably include a construction analyzer for analyzing message construction based on the word dictionary database when a message is received without word spacing. The communication terminal may also preferably include a message arranger for arranging the received message based on output from the construction analyzer.

Furthermore, the communication terminal may also preferably include a microprocessor program controller (MPC) and a memory device to store programs, the word dictionary database, and other data. The communication terminal may also preferably include hardware such as an output device, for example an liquid crystal display (LCD) to display messages, and an input device, for example a keypad to enable to user to select a message composition mode, compose the message, and set the word spacing function, etc.

Figure 2:
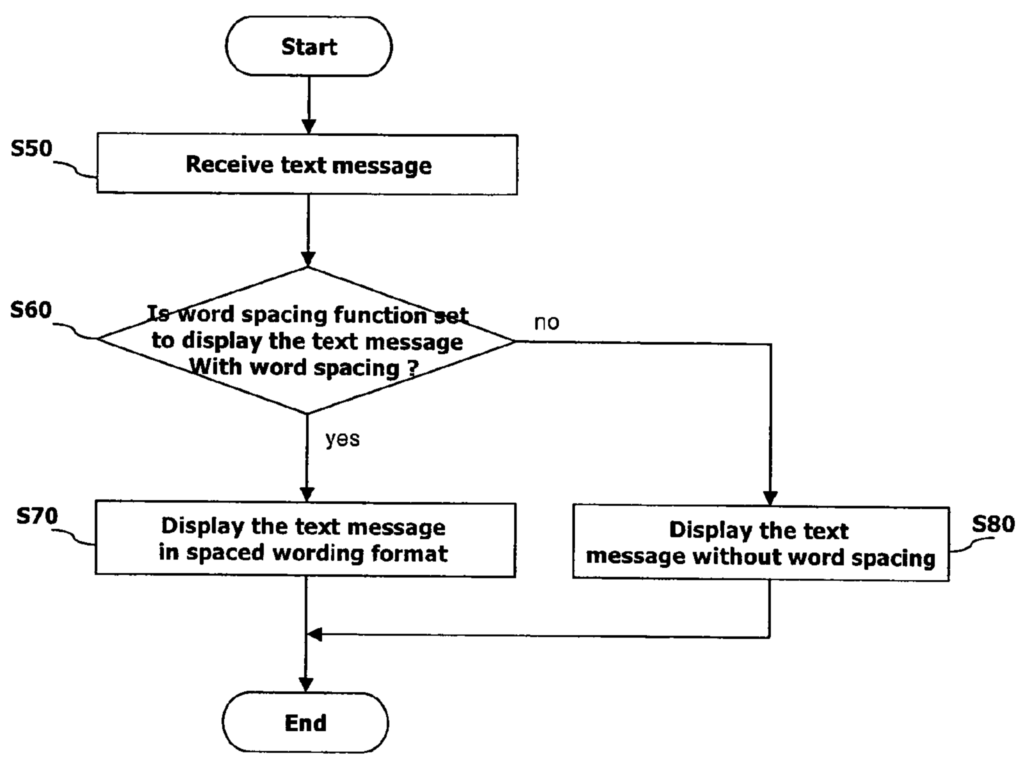
FIG. 2 is a flow diagram illustrating a method for receiving and processing a message, according to one embodiment of the present invention.

FIG. 1 is a flow diagram illustrating a method for preparing and sending a message, according to one embodiment of the present invention. FIG. 2 is a flow diagram illustrating a method for receiving and processing a message, according to one embodiment of the present invention.

Referring to FIG. 1, at step S10, the user sending the text message (sending user) selects a message writing menu from the sending terminal. At step S20, the sending user sets the word spacing function. To set the word spacing function is to program the control information for performing the word spacing function. The word spacing function may preferably be set by a menu selection. For example, the sending user may enter a phone number or e-mail address of a receiving user via a keypad and then set the word spacing function to 'display text with word spacing' by selecting an appropriate menu option. At step S30, the user composes the text message by, for example, using an SMS editor. The text message may preferably be composed without inserting any spaces between words. At step S40, the sending user sends (transmits) the text message to the receiving user by pressing a send key on the sending terminal. When sent, the text message includes setting information (control information) of the word spacing function. In other words, the text message is sent with the control information from the sending terminal to the receiving terminal. More specifically, a transmission signal carrying the text message may preferably also include a check bit to indicate whether the word spacing function is set as enabled (on) or disabled (off). For example, the text message may be sent to the receiving terminal together with the check bit, and, if the check bit is set to a value of '1' the word spacing function is enabled. On the other hand, if the check bit is set to a value of '0' the word spacing function is disabled. If the word spacing function is enabled (control information is programmed to insert spaces), then spaces are inserted between words at the receiving terminal. If the word spacing function is disabled (control information is programmed not to insert spaces), then no spaces are inserted between the words.

Referring now to FIG. 2, at step S50 the receiving terminal receives the text message. The receiving user may preferably be notified of the receipt of the text message by, for example, vibration or ringing of the receiving terminal. The receiving user may preferably press an appropriate key on the receiving terminal to check the received text message. At step S60, a program is run, for example by the MPC of the receiving terminal to check whether the word spacing function is enabled. In other words, a check is made to determine whether the word spacing function is set to display the text message with word spacing. If the word spacing function is enabled, the construction analyzer may preferably analyze the construction of the received text message using the word dictionary database. At step S70, the text message is arranged and displayed in spaced wording format. Arrangement of the text message may preferably be performed by the message arranger based on output from the construction analyzer. The display of the text message may preferably be to the LCD of the receiving terminal.

On the other hand, at step S80, if the word spacing function is disabled, the text message is displayed without word spacing.

Figure 3:
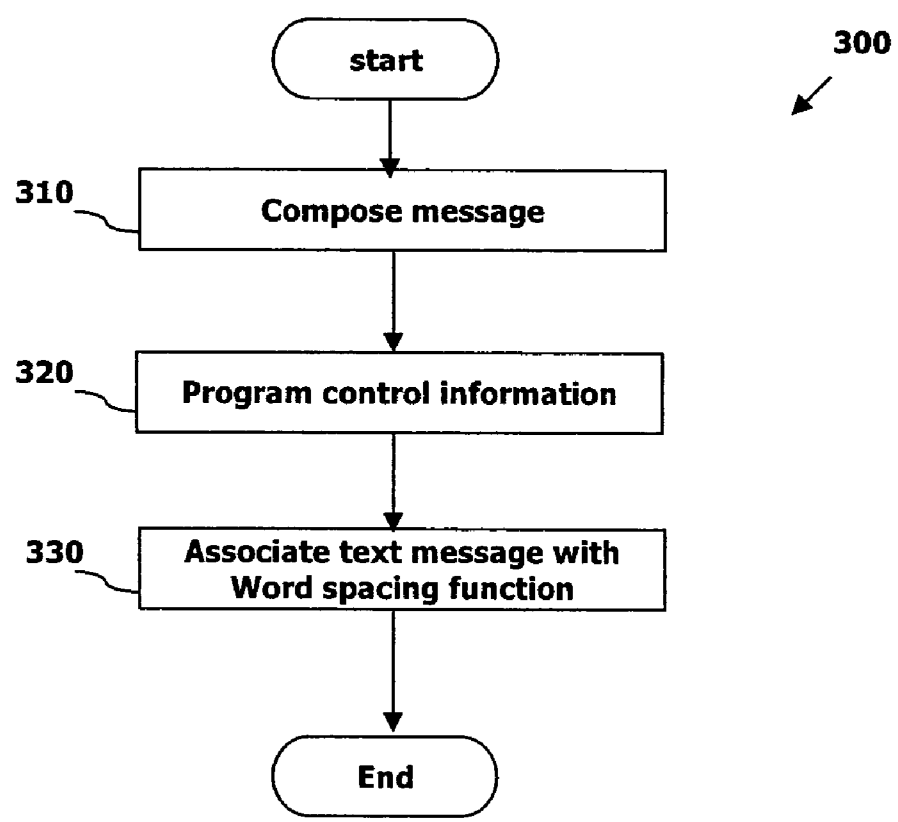
FIG. 3 is a flow diagram illustrating a method for preparing a message, according to one embodiment of the present invention.

FIG. 3 is a flow diagram illustrating a method for preparing a message, according to one embodiment of the present invention.

Referring to FIG. 3, at step 310, a message is composed. The message may preferably be a text message. At step 320, control information is programmed for performing a word spacing function. The control information may preferably assert whether to insert spaces between words of the message. That is, the control information may preferably dictate whether or not spaces are to be inserted between words in an unspaced text message. The determination of whether or not to insert spaces is made by the user in programming the control information by, for example, making an appropriate menu selection. At step 330, the message is associated with the control information. The message may preferably be composed without word spacing. The step of programming the control information may preferably include setting one data bit (check bit). The method may preferably also include sending the message and the control information (corresponding control information).

Figure 4:
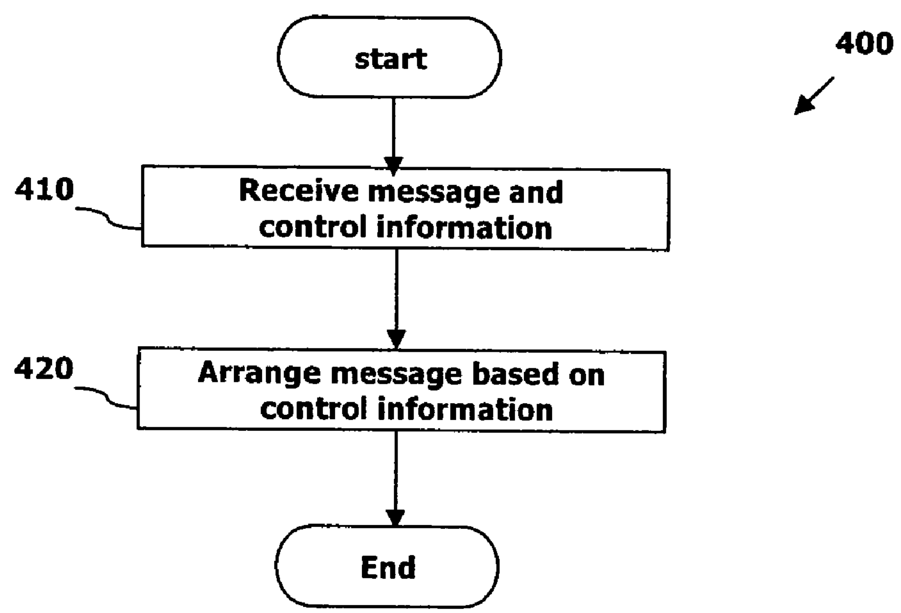
FIG. 4 is a flow diagram illustrating a method for processing a message, according to one embodiment of the present invention.

FIG. 4 is a flow diagram illustrating a method for processing a message, according to one embodiment of the present invention.

Referring to FIG. 4, at step 410, the message and control information for performing a word spacing function are received. At step 420, the message is arranged based on the control information.

The step of arranging the message based on the control information may preferably include steps of arranging the message in spaced-wording format if the control information is programmed (set) to arrange the message with word spacing, and arranging the message without word spacing if the control information is programmed to arrange the message without word spacing. The step of arranging the message based on the control information may also preferably include a step of analyzing the message using a word dictionary database to recognize words in the message.

The method for processing a message at a communication terminal may also preferably include a step of checking whether the word spacing function is set to display the message with word spacing. The method for processing a message at a communication terminal may also preferably include steps of displaying the message in spaced-wording format if the control information is programmed to display the message with word spacing and displaying the message without word spacing if the control information is programmed to display the message without word spacing.

The message may preferably be a short message service (SMS) message, a long message service (LMS) message, a multimedia messaging system (MMS) message, or an electronic mail (E-mail) message. The communication terminals may be either wired, mobile, or some combination of wired and mobile terminals. The step of setting the word spacing function may preferably include selecting an appropriate option from a message menu displayed in the communication terminal.

Figure 5A:
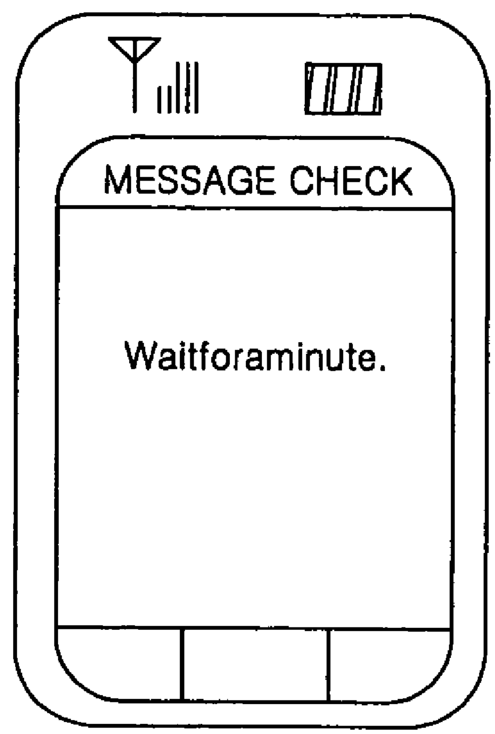
FIGS. 5A and 5B are diagrams showing exemplary views of a communication terminal in which a message is processed for word spacing, according to one embodiment of the present invention.
Figure 5B:
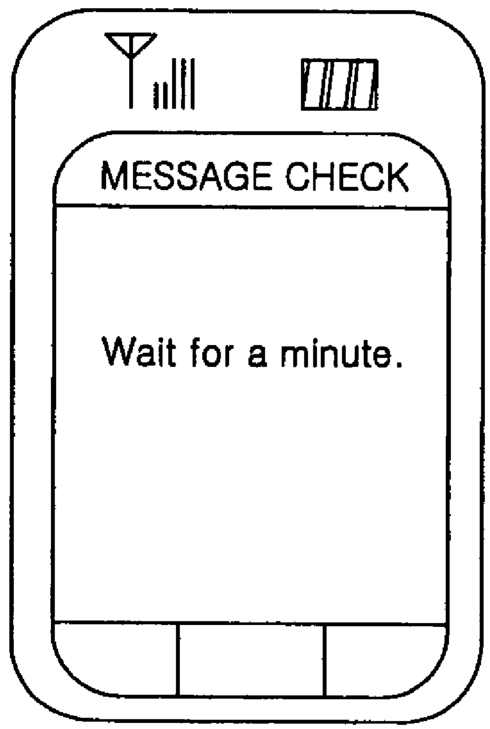

FIGS. 5A and 5B are diagrams showing exemplary views of a communication terminal in which a message is processed for word spacing, according to one embodiment of the present invention.

Referring to FIGS. 5A and 5B, the techniques described herein are exemplified in the processing of a text message for word spacing in a communication terminal. In FIG. 5A, the text message 'waitforaminute' is composed. Note that the text message is in unspaced format. However, as shown in FIG. 5B, since the word spacing function is enabled, the text message is arranged and displayed on the LCD of the receiving terminal in spaced wording format to read 'wait for a minute'.

Figure 6:
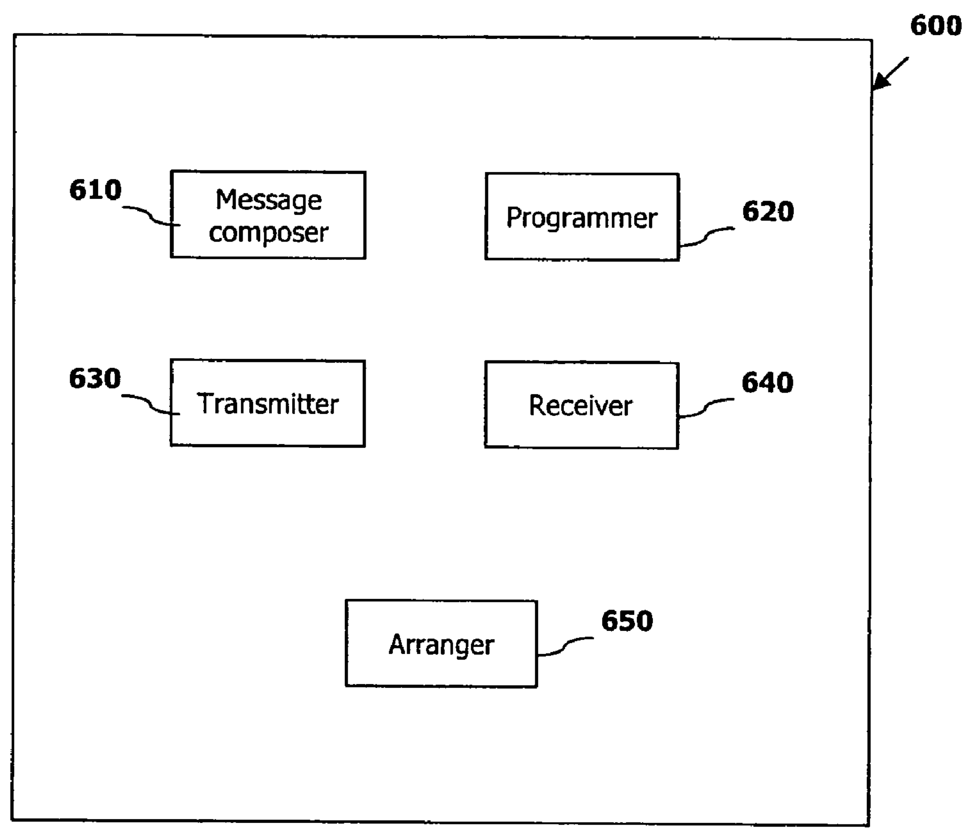
FIG. 6 is a block diagram showing a communication apparatus, according to one embodiment of the present invention.

FIG. 6 is a block diagram showing a communication apparatus 600, according to one embodiment of the present invention. The communication apparatus 600 includes a message composer 610 used to compose a message. The communication apparatus 600 also includes a programmer 620 used to program control information for performing a word spacing function. The control information is configured to assert whether to insert spaces between words of the message. The communication apparatus 600 also includes a transmitter 630 configured to transmit the message and the control information to another communication apparatus. The communication apparatus 600 also includes a receiver 640, configured to receive a message and control information sent from the another communication apparatus. The communication apparatus 600 also includes an arranger 650, configured to arrange the message sent from the another communication apparatus based on the control information sent from the another communication apparatus.

The control information may preferably include one data bit (check bit). The communication apparatus 600 may preferably include a word dictionary database configured to analyze and recognize words in the message. The communication apparatus 600 may preferably also include a control information checker configured to check whether the control information is programmed to arrange the message sent from the another communication apparatus with word spacing by, for example, checking to see if the check bit is set to '0' or '1'. The communication apparatus 600 may also preferably include a display for displaying the message. The communication apparatus and/or the another communication apparatus may preferably be a mobile terminal. Alternatively, the communication apparatus and/or the another communication apparatus may preferably be a wired terminal.

Regarding message construction analysis and message arrangement based on the word dictionary database, a method for comparing a threshold with a space insertion probability for each pair of syllables using a syllable bigram characteristic may preferably be used. Alternatively, a method for word spacing may preferably use a syllable unit condition probability.

In another embodiment, a method for preparing an outgoing message includes composing the message, programming control information for performing a word spacing function, and associating the outgoing message with the control information. The control information may preferably assert whether to insert spaces between words of the outgoing message. In yet another embodiment, a method for processing a message includes receiving an incoming message and incoming control information for performing the word spacing function, and arranging the incoming message based on the incoming control information. An unspaced message may be sent, allowing the sending to include more letters, numbers, symbols, or other 'non-space characters' in the message. Furthermore, because the message is sent with the control information, the message may be arranged and displayed in spaced-wording format, allowing for easier reading by the message recipient.

By sending the message without spacing between words (unspaced message), the user of the communication terminal that sends the message (sending terminal) may include more letters, numbers, symbols, or other 'non-space characters' in the message being sent because 'space characters' are not using available message character capacity. Furthermore, because the message is sent with the word spacing function, when the message is received at the receiving communication terminal (receiving terminal), the message may be arranged and displayed with spaces between the words (spaced-wording format). By displaying the message in spaced-wording format, the message may be more easily read by the user of the receiving terminal.

Although the present invention may preferably be applied to text messages, the present invention may also be applied to other types of messages, including non-text messages.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for preparing a message at a communication terminal, the method comprising the steps of:

composing the message;

programming control information for performing a word spacing function to assert whether to insert spaces between words of the message; and associating the message with the control information, wherein the message is composed without word spacing if the control information indicates that no spaces are to be inserted.

2. The method according to claim 1, wherein the step of programming the control information comprises selling one data bit.

3. The method according to claim 1, wherein the method further comprises a step of sending the message and the control information.

4. The method according to claim 1, wherein the message is of a type selected from the group consisting of:

a short message service (SMS) message;

a long message service (LMS) message;

a multimedia messaging system (MMS) message; and an electronic mail (E-mail) message.

5. The method according to claim 1, wherein the communication terminal is a mobile terminal.

6. The method according to claim 1, wherein the communication terminal is a wired terminal.

7. The method according to claim 1, wherein the step of programming the control information comprises selecting an appropriate option from a message menu displayed in the communication terminal.

8. A method for processing a message at a communication terminal, the method comprising the steps of:

receiving the message and programmed control information for performing a word spacing function, the control information configured to assert whether to insert spaces between words of the message;

arranging the message based on the control information; and displaying the message in a spaced-wording format if the control information is programmed to display the message with word spacing and displaying the message without word spacing if the control information is programmed to display the message without word spacing.

9. The method according to claim 8, wherein the step of arranging the message based on the control information comprises steps of:

arranging the message in spaced-wording format if the control information is programmed to arrange the message with word spacing; and arranging the message without word spacing if the control information is programmed to arrange the message without word spacing.

10. The method according to claim 8, wherein the step of arranging the message based on the control information comprises a step of:

analyzing the message using a word dictionary database to recognize words in the message.

11. The method according to claim 8, wherein the method further comprises a step of checking whether the control information is programmed to arrange the message with word spacing.

12. The method according to claim 8, wherein the message is of a type selected from the group consisting of:

a short message service (SMS) message;

a long message service (LMS) message;

a multimedia messaging system (MMS) message; and an electronic mail (E-mail) message.

13. The method according to claim 8, wherein the communication terminal is a mobile terminal.

14. The method according to claim 8, wherein the communication terminal is a wired terminal.

15. A communication apparatus, comprising:

a message composing unit for composing a message;

a programming unit for programming control information used to perform a word spacing function, the control information configured to assert whether to insert spaces between words of the message;

a transmitting unit for transmitting the message and the control information to another communication apparatus; and a display unit for displaying the message in a spaced-wording format if the control information is programmed to display the message with word spacing and displaying the message without word spacing if the control information is programmed to display the message without word spacing.

16. The communication apparatus according to claim 15, further comprising:

a receiving unit for receiving a message and control information sent from the another communication apparatus; and an arranging unit for arranging the message sent from the another communication apparatus based on the control information sent from the another communication apparatus.

17. The communication apparatus according to claim 15, wherein the control information sent from the another communication apparatus comprises one data bit.

18. The communication apparatus according to claim 15, further comprising:

a word dictionary database configured to analyze and recognize words in the message sent from the another communication apparatus.

19. The communication apparatus according to claim 15, further comprising:

a checking unit for checking whether the control information is programmed to arrange the message sent from the another communication apparatus with word spacing.

20. The communication apparatus according to claim 16, wherein the display unit displays the message sent from the another communication apparatus.

21. The communication apparatus according to claim 15, wherein at least one of the group consisting of:

the communication apparatus; and the another communication apparatus, is a mobile terminal.

22. The communication apparatus according to claim 15, wherein at least one of the group consisting of:

the communication apparatus; and the another communication apparatus, is a wired terminal.

* * * * *